United States Patent
Joyce

(10) Patent No.: US 6,247,852 B1
(45) Date of Patent: Jun. 19, 2001

(54) STABILIZED MODULE

(75) Inventor: William Baxter Joyce, Basking Ridge, NJ (US)

(73) Assignee: Lucent Technologies INC, Murray Hill, NJ (US)

( * ) Notice: Subject to any disclaimer, the term of this patent is extended or adjusted under 35 U.S.C. 154(b) by 0 days.

(21) Appl. No.: 09/375,756

(22) Filed: Aug. 18, 1999

(51) Int. Cl.[7] ........................................ G02B 6/36
(52) U.S. Cl. ............................ 385/90; 385/88; 385/89; 385/91
(58) Field of Search ................................ 385/88, 89, 90, 385/91; 250/227.14, 227.16, 227.24

(56) References Cited

U.S. PATENT DOCUMENTS

| | | | |
|---|---|---|---|
| 4,471,474 | * | 9/1984 | Fields ..................................... 367/149 |
| 5,572,614 | * | 11/1996 | Lucas, Jr. ............................... 385/91 |
| 5,963,695 | * | 10/1999 | Joyce ...................................... 385/88 |

OTHER PUBLICATIONS

"Alignment of Gaussian Beams", W.B. Joyce and B.C. DeLoach, 12.1/84, pp. 4187–4196, Optical Society of America.

Patent Application "Method for Aligning the Optical Fiber and Laser of Fiber Optic Laser Modules", by the Inventor W.B. Joyce 11–14 et al, Filed Nov. 24, 1998.

\* cited by examiner

Primary Examiner—Hemang Sanghavi
Assistant Examiner—Sung Pak
(74) Attorney, Agent, or Firm—Walter J. Tencza, Jr.

(57) ABSTRACT

The present invention disclose a method comprising the steps of fixing a first device to a first housing using a first manufacturing process and fixing a second device to a first housing using a second manufacturing process. The first device can be a laser and the second device an optical fiber. After the first and second device have been fixed to the first housing, the first device lies at a first position relative to the second device. The first device, the second device, and the first housing comprise a first sample. The first sample can be flexed by an amount y1. The first sample is next subjected to a deterioration process such as baking. After the deterioration process it is determined whether the first device lies within a range of the first position relative to the second device. The method may also comprise fixing a third device and a fourth device to a second housing using the same first and second manufacturing processes as for the first sample. The third and fourth devices may be the same type of devices as the first and second devices. The third device will lie at a second position relative to the fourth device in the completed second sample. The second sample can be flexed an amount y2 which can be different from the amount y1. After flexing the second sample would be subjected to the deterioration process. The second position would be checked after the deterioration process to see if it lies within a range. This method can be repeated for any number of samples to determine the appropriate amount of flexing of a sample of a certain type needed to achieve the most reliable positioning results. The deterioration process is designed to simulate the stress, wear, and tear that will be experiences by a sample during its lifetime. If the positioning of the first device with respect to the second device remains fairly constant after a deterioration process it means that the sample will be more reliable for a longer time period. The flexing can be bending or twisting or any other manner of applying force to the sample.

17 Claims, 6 Drawing Sheets

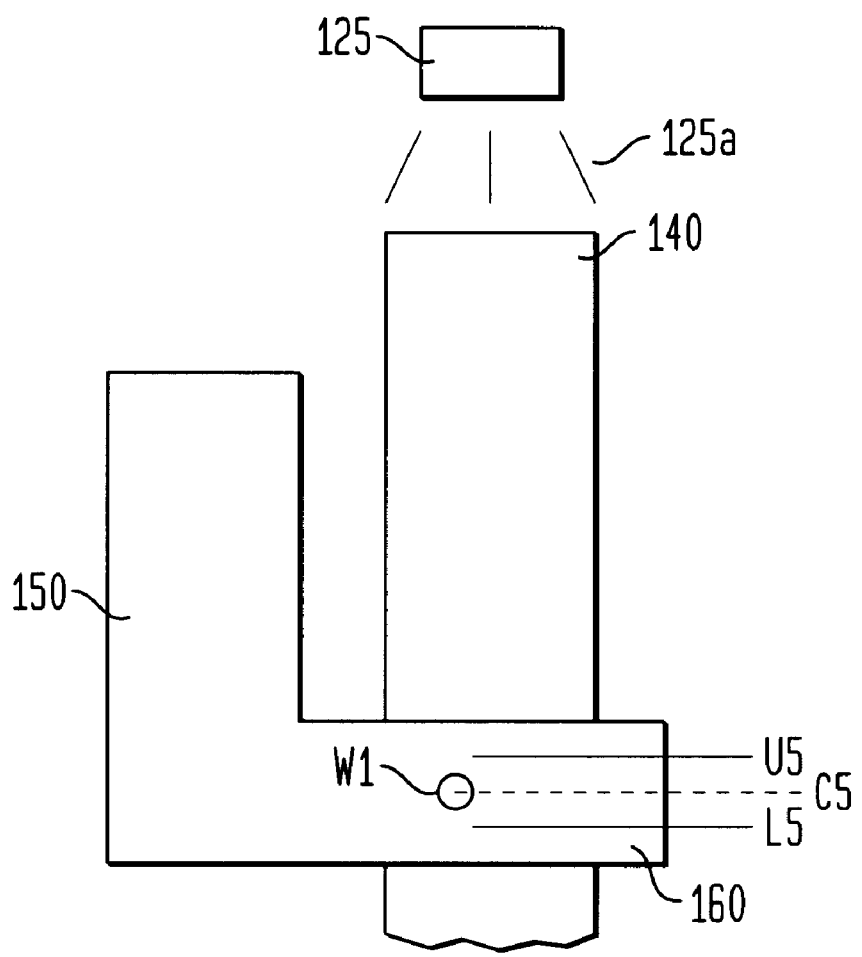

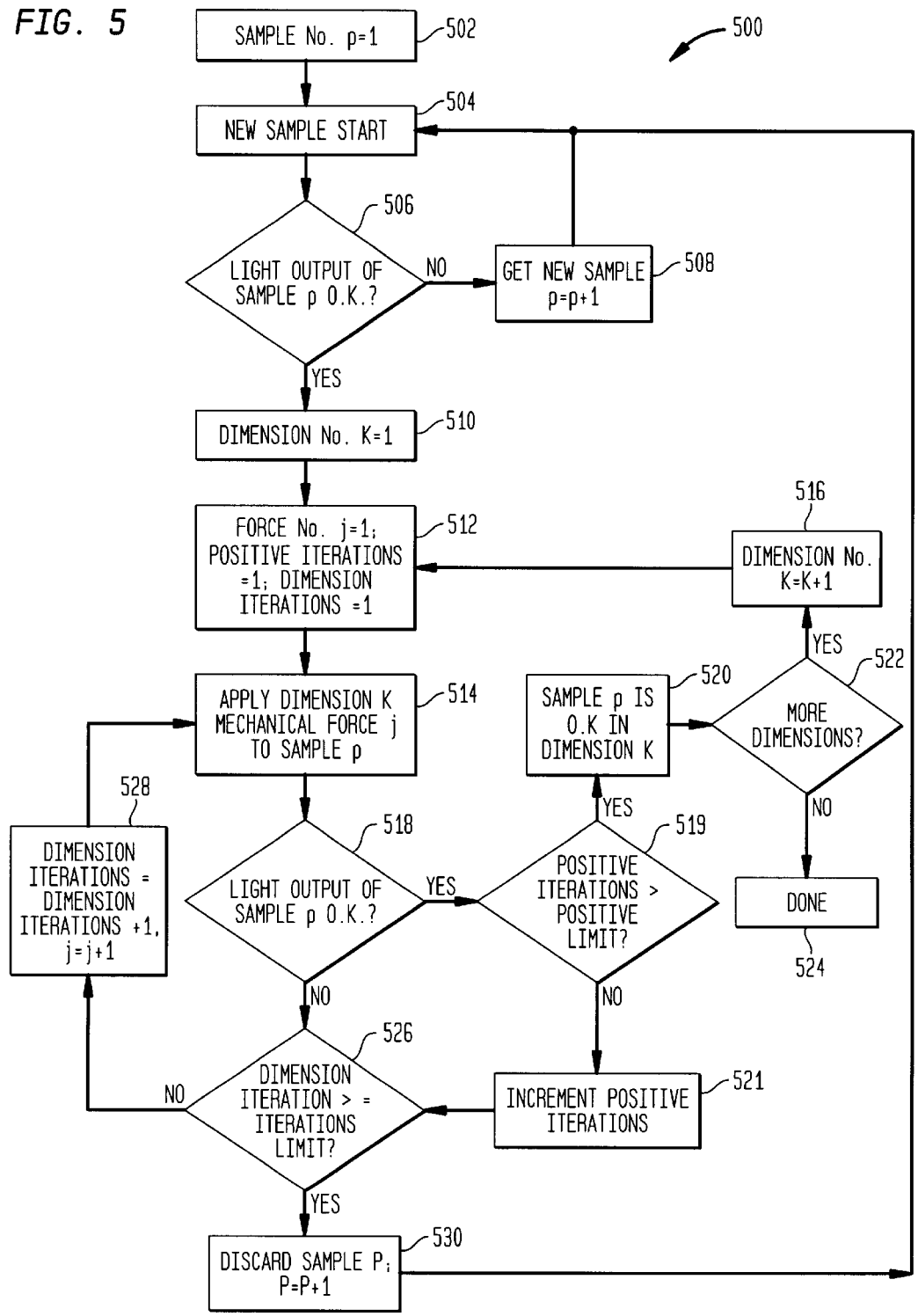

STABILIZED MODULE

FIELD OF THE INVENTION

This invention relates to maintaining alignment of devices which are subject to stresses and variations over time, and which are subject to initial manufacturing or assembly stresses.

BACKGROUND OF THE INVENTION

Typical manufacturing processes leave a mechanical module at, or close to, the elastic-plastic transition. In mechanical modules that involve laser beam and fiber optic alignment being close to the elastic-plastic transition results in positional change or creep over time. This is particularly true if there are changes in the applied stress (such as temperature change or mounting deformation).

Currently a heating or thermal cycle is used to reposition the elastic response region. This process has only one degree of freedom and cannot deal with x, y, z, $\theta$, or $\phi$ (x, y, and z are variations in three dimensions, and $\theta$, or $\phi$ are variations in rotational dimensions). This process also is time consuming and still leaves products near their elastic limits.

SUMMARY OF THE INVENTION

The present invention in one embodiment moves the elastic plastic transition points away from the desired equilibrium point. To achieve this mechanical deformation can be used. In addition a heat or thermal cycle may also be used.

The present invention in one embodiment includes a method comprising the step of obtaining a first sample wherein the first sample is a fiber optic apparatus having a light output. The method is further comprised of the step of checking the light output of the fiber optic apparatus. The fiber optic apparatus can then be subjected to a first force in a first dimension. The light output can be checked after the first force in the first dimension is applied. If the light output is not satisfactory, one or more further forces in the first dimension can be applied until the light output is satisfactory. If after applying one or more forces of somewhat lesser magnitude, the light output is still satisfactory, it indicates that the elastic transition points are far away from the equilibrium point in the first dimension. The method can be executed in one or more dimensions. Alternatively or additionally the method can be implemented so that one or more forces act in a plurality of dimensions.

The present invention in one embodiment includes a method comprising the steps of fixing a first device to a first housing using a first manufacturing process and fixing a second device to a first housing using a second manufacturing process. The first device can be a laser and the second device an optical fiber. After the first and second device have been fixed to the first housing, the first device lies at a first position relative to the second device. The first device, the second device, and the first housing comprise a first sample. The first sample can be flexed by an amount y1. The first sample is next subjected to a deterioration process such as baking. After the deterioration process it is determined whether the first device lies within a range of the first position relative to the second device. For a system comprised of a light source and an optic fiber this can be determined by examining the light output from the optical fiber.

The method may also comprise fixing a third device and a fourth device to a second housing using the same first and second manufacturing processes as for the first sample. The third and fourth devices may be the same type of devices as the first and second devices. The third device will lie at a second position relative to the fourth device in the completed second sample. The second sample can be flexed an amount y2 which can be different from the amount y1. After flexing the second sample would be subjected to the deterioration process. The second position would be checked after the deterioration process to see if it lies within a range. This method can be repeated for any number of samples to determine the appropriate amount of flexing of a sample of a certain type needed to achieve the most reliable positioning results.

The deterioration process is designed to simulate the stress, wear, and tear that will be experiences by a sample during its lifetime. If the positioning of the first device with respect to the second device remains fairly constant after a deterioration process it means that the sample will be more reliable for a longer time period.

The flexing can be bending or twisting or any other manner of applying force to the sample. The force may be applied to the housing, or directly to the first or second devices. The process of determining an appropriate amount of flexing needed results in elimination of use of the deterioration process (such as baking) as a method of checking the stability of future samples. I.e. after the appropriate amount of flex is determined it can be applied to future samples to center their elastic range so that the samples are have more reliable positioning.

BRIEF DESCRIPTION OF THE DRAWINGS

FIG. 2E shows an example where there is only one weld for a portion of an optical apparatus;

FIG. 5 shows a flow chart in accordance with an embodiment of a method of the present invention.

DETAILED DESCRIPTION OF THE DRAWINGS

Figure 1:
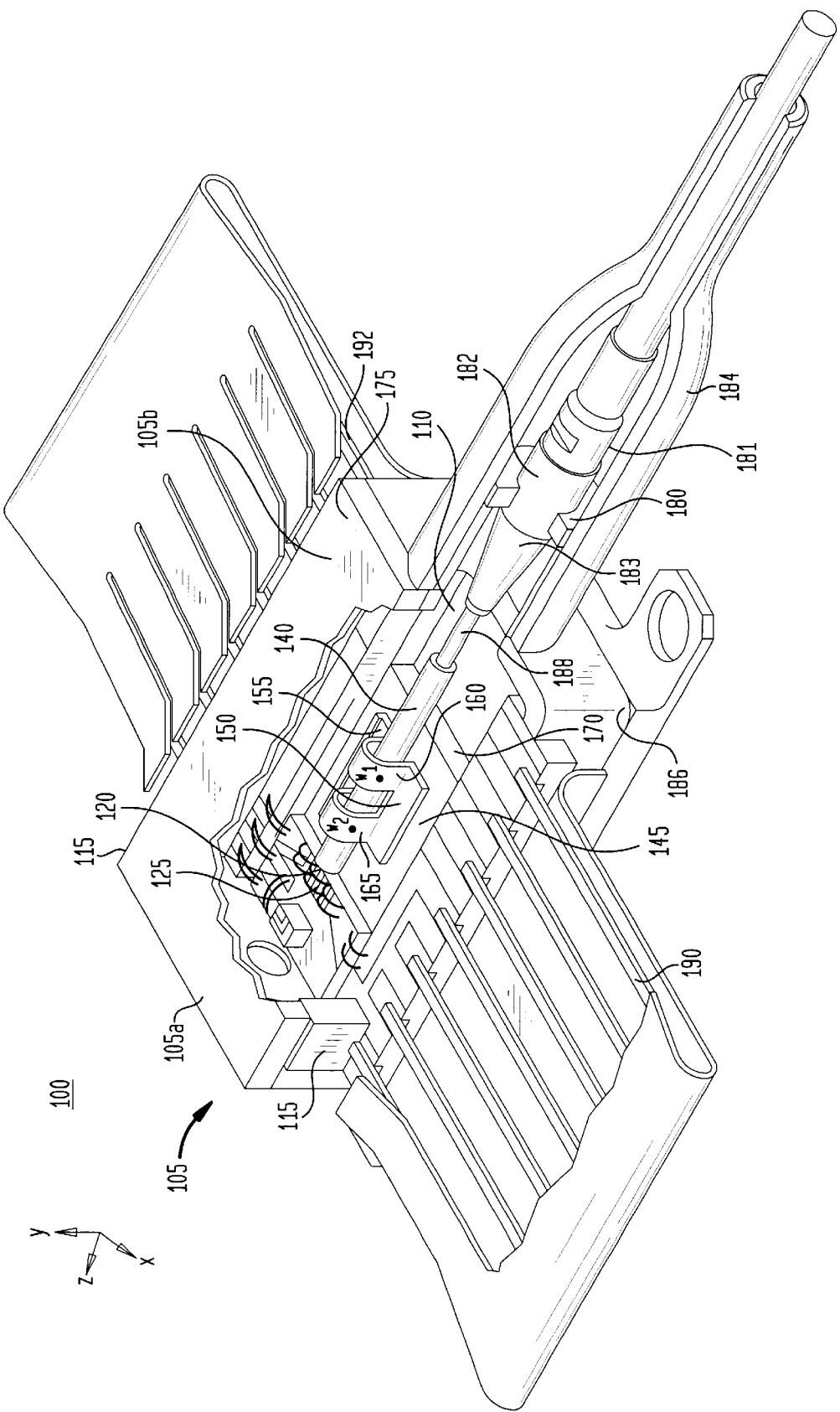
FIG. 1 shows an optical apparatus.

FIG. 1 shows a first sample 100 of an optical apparatus comprised of first device 125 and a second device 120 fixed to a housing 105. In this case the first device 125 is a laser, the second device 120 is an optical fiber, and the housing is the casing for the laser 125 and the optical fiber 120. Optical modules, such as transmitters, receivers and/or transceivers, typically use a so-called "14-pin butterfly" package to house optical components hermetically in a box. Such an optical package includes an assembly platform, typically holding an optical fiber in alignment with an optical component, such as a laser or detector. More specifically, the optical component (s) is welded to a carrier, and in turn, the carrier is soldered to the platform. Moreover, the optical fiber is encased within a ferrule, such as a ferrule 140 shown in FIG. 1, welded to a clip, such as a clip 145, the clip 145 welded to another carrier 170, and, in turn, the carrier 170 soldered to the assembly platform 110 so as to maintain the alignment between the optical fiber and the optical component(s).

During assembly, unwanted stress in the module causes the optical fiber, such as optical fiber 120 (or a metal ferrule 140) to move relative to the optical component(s), such as the laser 125, thereby lowering the coupling efficiency.

Without any loss of generality or applicability for the principles of the invention, the embodiments below are directed to a laser module. It should, however, be clearly understood that the present invention is equally applicable to an optical receiver, transceiver, to an optical module housing optical components, or to any mechanical objects where stability of relative positions is required.

FIG. 1 shows an exemplary embodiment of a "14-pin butterfly" package laser module 100 (which will also be called sample 100) comprising: a housing 105 having a top portion 175 which is shown in cutaway form but actually covers the entire top of housing 105 and which is actually sealed, an assembly platform 110; and sidewalls 115. There is an opening at an end sidewall of the housing 105 for allowing the passage of a ferrule 140 (the ferrule is a single rod of varying diameters which includes 140,182,183, and 188) to the exterior of the housing 105.

Optical fiber 120 is held within a metal ferrule 140 which extends through the opening to the exterior of the housing. Alignment between fiber 120 and laser 125 is maintained by a U-shaped clip 145 which is welded to ferrule 140, for example, at locations labeled as W1 and W2, as discussed in more detail herein below. Referring to FIG. 1, clip 145 includes base portions 150, 155 which extend substantially parallel to fiber 120 along the z-axis. Pairs of posts or vertical members 160, 165 are joined in a U-shaped manner to form a receiving cavity for ferrule 140. U-shaped clip 145 is welded to a carrier 170, which is in turn, soldered to assembly platform 110. Also shown in FIG. 1 is snout 180.

FIGS. 2A–2D demonstrate the basic methods employed in an embodiment of the present invention. FIGS. 2A through 2D all show a portion of laser 125 and lines 125a to show light coming out of the laser 125, the ferrule 140, the posts 160 and 165, the welds W1 and W2, and the base 150.

Figure 2A:
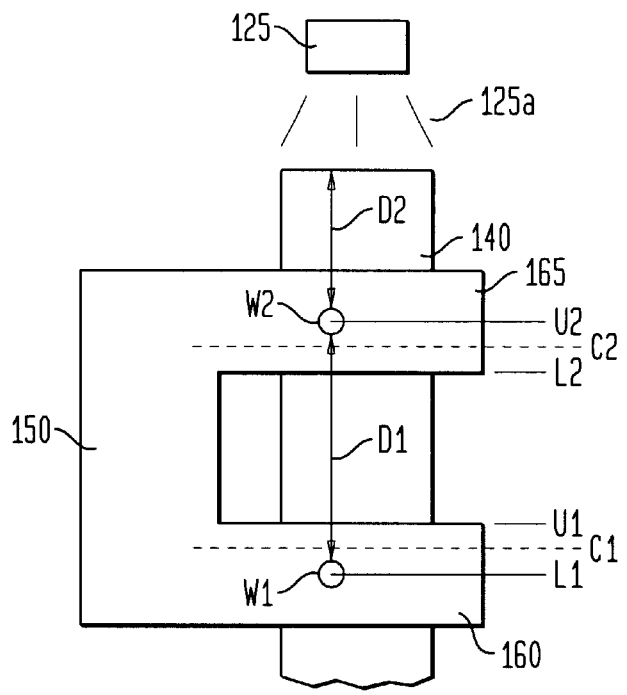
FIG. 2A shows a portion of the optical apparatus of FIG. 1, prior to being mechanically adjusted.

FIG. 2A shows the above portions of the optical apparatus 100 in a first state of equilibrium. In the first state of equilibrium the laser weld W2 is in a position so that it is at the limit of its elastic-plastic range. In the FIG. 2A state, the weld W2 has an elastic range having an upper limit of U2, a lower limit of L2, and a center point of C2. Similarly the weld W1 has an elastic range having an upper limit of U1, a lower limit of L1, and a center point of C1. As such, the weld W1 is at its lower limit of L1, and the weld W2 is at its upper limit of U2. Over time one of the welds W1 or W2 may creep outside of its current position and outside of its elastic range. If for example weld W1 creeps outside of its elastic range while W2 does not, the position of the weld W1 will move causing the ferrule 140 to move, causing the optical fiber 120 to move, causing misalignment between the optical fiber 120, and the laser light source 125. Alignment between the optical fiber 120 within ferrule 140, and the laser 125 is important so that a maximum or constant amount of light 125a can be received by the optical fiber 120 and a maximum or constant light output exitting through the snout 180 shown in FIG. 1.

When for example the weld W1 creeps out of its elastic limits (while the weld W2 does not), both the weld W1 and the weld W2 will move from the position shown in FIG. 2A and cause misalignment of the laser 125 and the optical fiber 120.

To prevent such misalignment over time, the present invention in one embodiment uses mechanical force to put both the weld W1 and the weld W2 at or nearer to the center of their elastic range, such as "U2" to "L2" in FIG. 2A. By putting the weld W1 and W2 into the centers of their respective ranges, the welds are less likely to greatly change position over time.

Figure 2B:
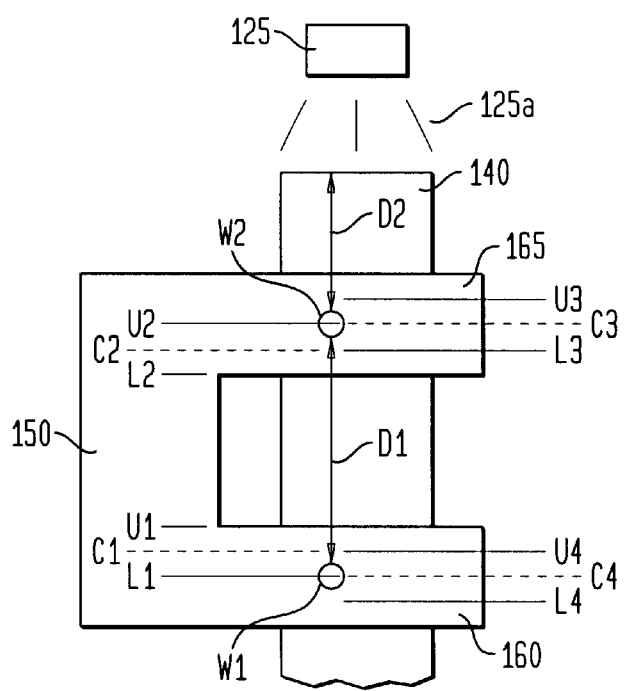
FIG. 2B shows the portion of the optical apparatus of FIG. 2A after a final mechanical adjustment.

FIG. 2B shows the desired result. In FIG. 2B, the posts 160 and 165 have been deformed relative to 150 so that weld W2 is located at the center point C3 of an elastic range having upper limit U3, lower limit L3, and center point C3. Because the weld W2 is at the center of its elastic range, it is less likely to change position over time and therefore it is less likely to cause ferrule 140 and optical fiber 120 to move with respect to laser 125. Similar to weld W2, the weld W1 is also moved so that the weld W1 is located at the center point C4 of an elastic range having upper limit U4, lower limit L4, and center point C4. Because the weld W1 is at the center of its elastic range, it is less likely to change position over time and therefore it is less likely to cause ferrule 140 and optical fiber 120 to move with respect to laser 125.

Figure 2C:
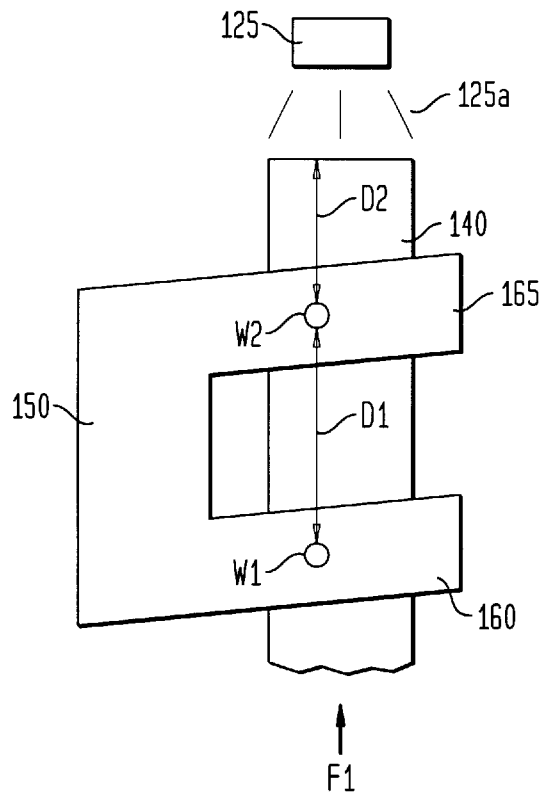
FIG. 2C shows the portion of the optical apparatus of FIG. 2A after an initial mechanical
Figure 2D:
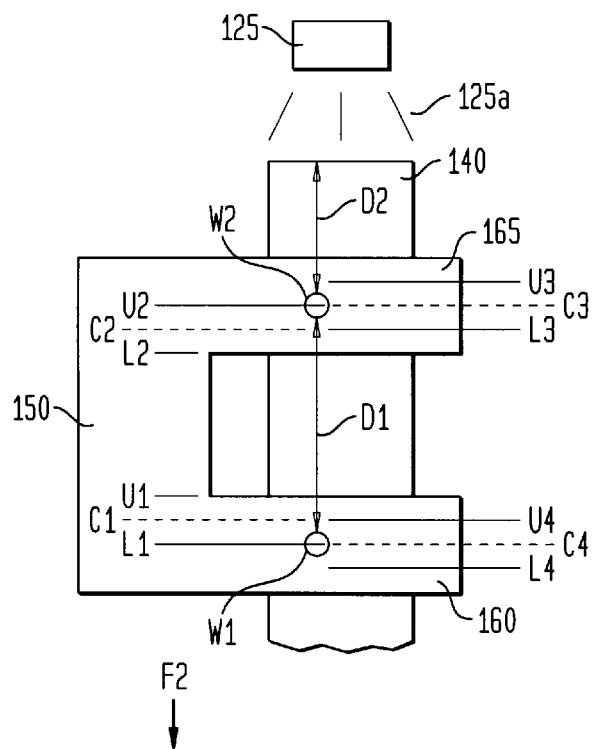
FIG. 2D shows the portion of the optical apparatus of FIG. 2A after the final mechanical adjustment.

In order to achieve the results of FIG. 2B, a method to be explained by referring to FIGS. 2C and 2D can be performed. An axial force F1 of FIG. 2C can be applied to the snout 180 of FIG. 1 of the sample 100 (optical apparatus 100). The force F1 pushes the welds W2 and W1 in the direction of the force, however the force exerted on weld W2 is not the same as on W1 because these welds are on opposite sides of their elastic ranges, i.e. the weld W2 is at its upper limit U2 of its elastic range in FIG. 2A while the weld W1 is at its lower limit L1 in FIG. 2A prior to forces being applied. Due to this the flexing of weld W2 from its initial position will be different from the flexing of weld W1 from its initial position; that is W2 will enter its plastic region and plastically deform whereas W1 will move into its elastic region and suffer no permanent change. After the force F1 is removed, the force F2, in FIG. 2D, can be supplied by pulling the snout 180 in FIG. 1 outwards. This exerts a force on the welds W2 and W1 in the direction of F2. However again the force actually exerted on W2 and W1 will be different because the welds W2 and W1 locations within their elastic limits, i.e. closer to upper limit U2 or U1 or closer to lower limit L2 or L1 respectively. The forces F1 and F2 can be selected so that after they are supplied the result is as shown in FIGS. 2B and 2D, where the locations of the welds W2 and W1 are centered within their respective elastic ranges.

The force F1 of FIG. 2C and F2 of FIG. 2D could be applied either by an z-direction force on 180 in FIG. 1 or by bending the housing 105 (also called the "case") around an x axis (parallel to the butterfly leads 190 and 192, or by bending the snout 180 relative to the housing 105 (around an x axis), or by other deformations of the housing 105.

Each weld (W2 and W1) in FIG. 2A has a mirror-image weld on the other side of 140 and on the other side of posts 165 and 160, respectively, of FIG. 1. If the pair of welds on one side of 140 are in different relative internal stress than the pair on the other side, then 140 will be bent up or down, perpendicular to the page, in the "y" direction, in FIG. 2A. Stress relaxation over time would cause 140 to move down or up in time. This vertical-motion stress is also eliminated by the process of FIG. 2C.

The reason that a manufactured product is often shipped with both welds at the elastic limit as in FIG. 2A is that if it is manufactured anywhere beyond the elastic limit it may promptly relax to the elastic limit.

The welds W1 and W2 (and opposite welds not shown) are means of attachment and can be replaced by other means of attachment such as welds, solder, glue, etc. The internal stress in FIG. 2A–D arises because there are more than one attachment point. If there were only one weld such as W1 as shown in FIG. 2E (weld W2 and post 165 shown cutoff), and if snout 180 applied a comparatively negligible force to ferrule 140 (or 182), ferrule 140 would immediately move relative to post 160 so that the dashed center line C5 would fall on weld W1 shown in FIG. 2E and be centered within the range comprised of limits U5 and L5 and thus there would be no built in stress. The utility of this invention arises when the attachment method acts at more than one point or over a range of points. Such multiple attachments are an element of the internal stress. Another element is a cause of stress between attachment points. These include attachment of parts with mismatched thermal-expansion coefficients, inhomogeneous temperature distribution at the time of attaching, and deformation of the module by the customer when for example the customer screws the module to a mounting plate. A location 181 shown in FIG. 1, is the location where ferrule 182 is soldered to snout 180.

Stress relief can also be accomplished by rotation. Each weld (W1 and W2) in FIG. 2A has a mirror-image weld on the other side of 140 at a location that is better envisioned from FIG. 1. If the pair of welds W1 and the opposite weld not shown on post 160 would position 140 at a different rotation angle about the z-axis than would the pair on post 165, then there is built in rotational analog of the process in FIG. 2C. The stress-relieving torsional deformation could be applied by twisting the housing 105 about the z axis, wherein one end 105a of housing 105 is twisted relative to the other end 105b.

In FIG. 2C the posts 160 and 165 are not perpendicular to 150. However, the posts 160 and 165 are still parallel to each other. The distance between the two welds W1 and W2, which is shown as D1, is the same as in FIGS. 2A–D, and the distance, D2 from the weld W2 to the end of 140 is also the same as in FIGS. 2A–D. In FIGS. 2D and 2B the geometry looks the same as in FIG. 2A. Typically, the only difference from FIG. 2A is that the elastic ranges are shifted so that in FIGS. 2B and 2D the dashed center "C" lines (C4 and C3 go through the center of the welds. However, it is possible that the distance, D1, between the welds W1 and W2, could be plastically altered.

Note that in the FIG. 1 embodiment a force could be applied by sliding plastic sleeve 184 away from the housing 105 and applying force to the snout 180 or to the ferrule 182 or by bending the housing 105. Typically the top 175 of the housing 105 is thinner and weaker than the bottom 186 of the housing 105. When a bending force is applied to the housing 105 so that the bottom 186 is curled downward, the welds W2 and W1 move apart from each other.

Figure 3A:
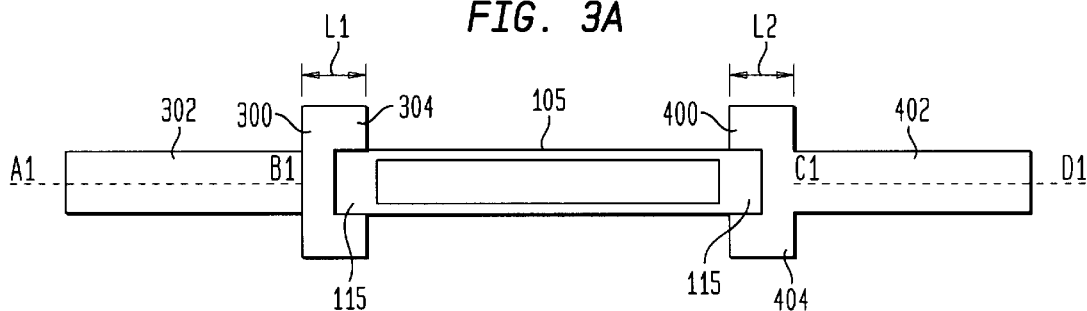
FIGS. 3A–B show a method of bending the apparatus shown in FIG. 1.
Figure 3B:
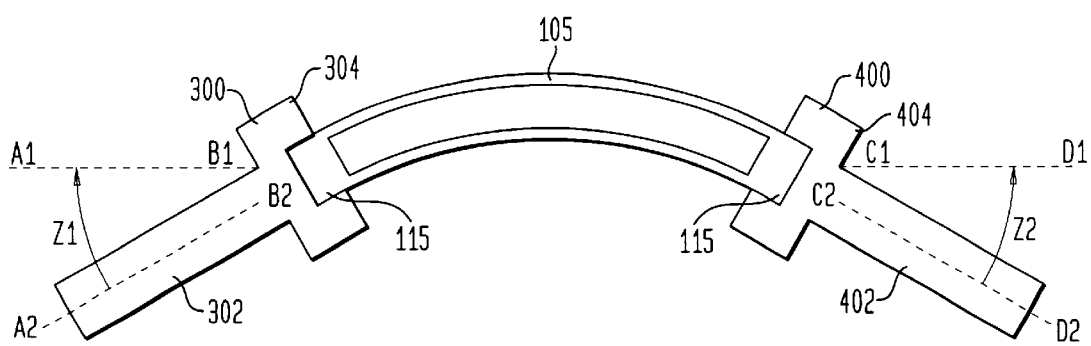

FIGS. 3A–B show a method of bending the sample 100 shown in FIG. 1. In FIG. 3A a clamp 300 comprised of handle 302 and U-Shaped bracket 304 is shown clamped tight on the left side of the housing 105. The length, L1, of the U-shaped bracket 304 can be such that it only extends along the sidewall 115 of the sample 100. A clamp 400 comprised of handle 402 and U-shaped bracket 404 is shown clamped tight on the right side of the housing 105. Similar to clamp 300, the length, L2, of its U-shaped bracket 404 can be such that it only extends along the sidewall 115 of the sample 100. If the length extended further there might be a possibility of damaging sample 100.

In operation, as shown in FIG. 3B, the sample 100 can be flexed in order to change the elastic range of the welds W2 and W1 of FIG. 1. FIG. 3B is an exaggerated drawing, and the amount of flexing may be very small. Clamp 300 may be forced downward so that a line segment A2 B2 bisecting through the clamp handle 304 makes an angle Z1 with the line segment A1 B1 which would normally bisect the handle 304 when the sample 100 is not being flexed. Similarly clamp 400 may be forced downwards so that that a line segment C2 D2 bisecting through the clamp handle 304 makes an angle Z2 with the line segment C1 D1 which would normally bisect the handle 304 when the sample 100 is not being flexed. The flexing causes changing of the elastic range similar to FIGS. 2A–D. The result, if the sample 100 has been flexed an appropriate amount, is to reposition the elastic range for the system comprised of first device (laser 125), second device (optical fiber 120), and housing 105 so that these components are more likely to remain stable.

Figure 4A:
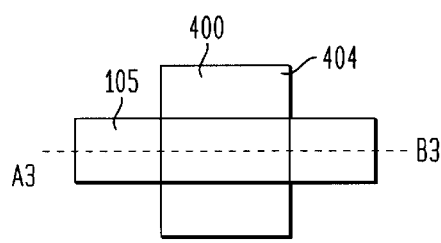
FIGS. 4A, 4B, 4C, and 4D show method of twisting the apparatus shown in FIG. 1.
Figure 4B:
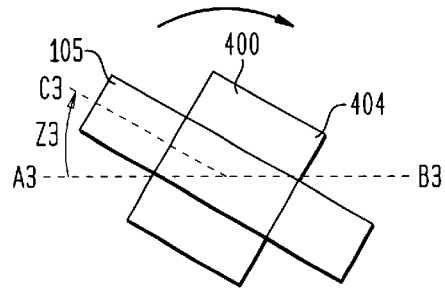
Figure 4C:
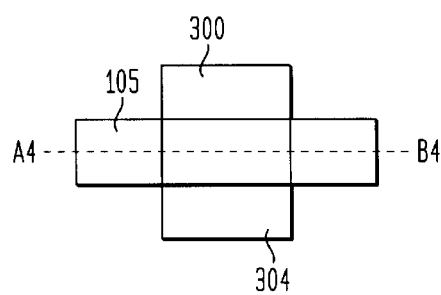
Figure 4D:
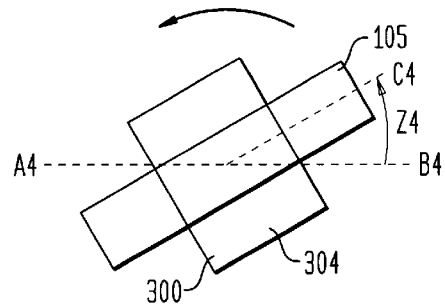

FIGS. 4A–B show a method of twisting the sample 100 in FIG. 1. The sample 100 can be twisted by turning the handle 404 of the clamp 400 clockwise while at the same time turning the handle 304 of the clamp 300 counterclockwise. As shown in FIG. 4B, the clamp 400 can be turned, for example, clockwise an angle Z3. The angle Z3 is then the angle between the line segment A3B3 which bisects the U-shaped bracket 404 at rest shown in FIG. 4A and the line segment C3 which bisects the U-shaped bracket 404 after it has been rotated an angle Z3. Similarly, as shown in FIG. 4C the clamp 300 can be turned, for example, counterclockwise an angle Z4. The angle Z4 is then the angle between the line segment A4B4 which bisects the U-shaped bracket 304 at rest shown in FIG. 4D and the line segment C4 which bisects the U-shaped bracket 404 after it has been rotated an angle Z4. The result, if the sample 100 has been twisted an appropriate amount, is to reposition the elastic range for the system comprised of laser 125, optical fiber 120 and housing 105 so that these components are more likely to remain stable.

After bending or flexing of the sample 100, the sample 100 may be subjected to a baking process as known in the art, for testing of optical components for wear and deterioration.

FIG. 5 shows a flow chart 500 in accordance with an embodiment of a method of the present invention. A step 502 a sample p is obtained. The sample may be an optical apparatus such as sample 100. Step 504 is a merely a label to indicate we are processing a new sample. A step 506, the light output of sample p (such as received at snout 180) is examined. If the light output is not initially satisfactory the pth sample is discarded as defective and another sample is obtained shown by incrementing p at step 508. If the light output is satisfactory a jth force is applied in the kth dimension to the sample p, at step 514 where j =1 and k=1 as indicated by steps 510 and 512. At step 518, the light output is checked. If the light output of the sample p is not satisfactory another force (j+1) is applied if the iterations limit has not been exceeded as shown by steps 526, 528 and 514. A plurality of somewhat lesser forces can be applied until the light output keeps "coming back" despite the sample p being subjected to various forces. During the final stages, after each force is applied (assuming the force does not push the sample into another elastic range), the light output should exceed a threshold level. Such resiliency would indicate that the sample p is well within its elastic-plastic transition points, at least in the dimension k. If the light output keeps not "coming back" for the iterations limit the sample p can be discarded and another sample obtained as shown by step 530. The sample is deemed satisfactory is the light output keeps "coming back", i.e. the light output exceeds a threshold for a preferably a plurality of different forces. An indication of acceptability can be provided on a machine (if the method is automated) or by a human operator to indicate that a sample is satisfactory.

Even if the light output is satisfactory at step 518, if the positive number of iterations are not greater than the positive limit at step 519 then the positive iterations are incremented at step 521 and the flows proceeds to step 526. There may be a need to get a plurality of positive light outputs before declaring that the sample p is stable, i.e. that the elastic-plastic transition points have been moved far away from the desired center point.

Forces can be applied in a plurality of dimensions. If the sample p is satisfactory in the kth dimension, as noted at step 520, then more dimensions is adjusted if the answer to a 'more dimensions ?' decision step 522 is 'yes' as shown by step 516, where the dimension k:=k+1 and the sample p can be adjusted in the next dimension after initialization at step 512, with the loop starting at step 514. If the answer to the 'more dimensions ?' decision step 522 is 'no' then the procedure is 'done' at step 524.

The process of checking the results by subjecting the sample to a deterioration process (e.g., baking) isn't necessarily done on every sample, although it might be for high-reliability applications. Alternately, the deterioration process might simply be used to "qualify" the flexing process. That is, some samples would be subjected to the deterioration process to show that the details of the flexing process had been adequately optimized for a particular module design. Thereafter, it would not be necessary to use deterioration on every sample. Commonly in industry "surveillance" is used instead. That is, samples are periodically drawn from production and subjected to deterioration to show that the flexing process received by every sample has not gone "out of control." For high-reliability applications like submarine communication cables or satellites it is common to "certify" every sample by subjecting every one to a deterioration process. For lower cost applications surveillance is typically used; i.e., only the occasional sample drawn from production is subjected to deterioration. In this case we say that we use surveillance to show that the production process remains under control (instead of certifying every sample individually).

I claim:

1. A method comprising the steps of:

fixing a first laser source to a first housing using a first manufacturing process;

fixing a first optical fiber to a first housing using a second manufacturing process;

wherein after the first laser source and first optical fiber have been fixed to the first housing, the first laser source lies at a first position relative to the first optical fiber, and wherein the first laser source, the first optical fiber, and the first housing comprise a first sample;

applying a first force to the first sample;

determining after the first force has been applied, but before a second force has been applied, whether the first laser source lies within a first range of the first position relative to the first optical fiber;

applying the second force to the first sample;

determining after the second force has been applied whether the first laser source lies within the first range of the first position relative to the first optical fiber;

wherein the first force is different from the second force;

and producing an indication of acceptability of the first sample if the first laser source lies within the first range of the first position relative to the first optical fiber after the first force has been applied but before the second force has been applied, and if the first laser source lies within the first range of the first position relative to the first optical fiber after the second force has been applied.

2. The method of claim 1 and further comprising the steps of:

fixing a second laser source to a second housing using the first manufacturing process;

fixing a second optical fiber to a second housing using the second manufacturing process;

wherein the second laser source and the first laser source are of the same type, the first optical fiber and the second optical fiber are of the same type, and the first housing and the second housing are of the same type;

wherein after the second laser source and second optical fibers have been fixed to the second housing, the second laser source lies at a second position relative to the second optical fiber, and wherein the second laser source, the second optical fiber, and the second housing comprise a second sample;

applying a third force to the second sample;

determining after the third force has been applied, but before a fourth force has been applied, whether the second laser source lies within a second range of the second position relative to the second optical fiber;

applying the fourth force to the second sample;

determining after the fourth force has been applied whether the second laser source lies within the second range of the second position relative to the second optical fiber;

wherein the third force is different from the fourth force;

and producing an indication of acceptability of the second sample if the second laser source lies within the second range of the second position relative to the second optical fiber after the third force has been applied but before the fourth force has been applied, and if the second laser source lies within the second range of the second position relative to the second optical fiber after the fourth force has been applied.

3. The method of claim 1 and wherein the step of applying the first force to the first sample includes flexing the first sample.

4. The method of claim 1 and wherein the step of applying the first force to the first sample includes applying the first force to the first laser source.

5. The method of claim 1 and wherein the step of applying the first force to the first sample includes applying the first force to the first optical fiber.

6. The method of claim 1 further comprising the step of subjecting the first sample to a deterioration process after the first force has been applied to the first sample but before the second force has been applied to the first sample.

7. The method of claim 2 and further comprising the steps of:

fixing a third laser source to a third housing using the first manufacturing process;

fixing a third optical fiber to a third housing using the second manufacturing process;

wherein the third laser source and the first laser source are of the same type, the first optical fiber and the third optical fiber are of the same type, and the first housing and the third housing are of the same type;

wherein after the third laser source and third optical fibers have been fixed to the third housing, the third laser source lies at a third position relative to the third optical fiber, and wherein the third laser source, the third optical fiber, and the third housing comprise a third sample;

applying a fifth force to the third sample;

determining after the fifth force has been applied, but before a sixth force has been applied, whether the third laser source lies within a third range of the third position relative to the third optical fiber;

applying a sixth force to the third sample;

determining after the sixth force has been applied whether the third laser source lies within the third range of the third position relative to the third optical fiber;

wherein the fifth force is different from the sixth force;

and producing an indication of acceptability of the third sample if the third laser source lies within the third range of the third position relative to the third optical fiber after the fifth force has been applied but before the sixth force has been applied, and if the third laser source lies within the third range of the third position relative to the third optical fiber after the sixth force has been applied.

8. The method of claim 2 and further wherein the first range and the second range are substantially the same.

9. The method of claim 2 further comprising the step of subjecting the second sample to a deterioration process after the third force has been applied to the second sample but before the fourth force has been applied to the first sample.

10. The method of claim 7 further comprising the step of subjecting the third sample to a deterioration process after the fifth force has been applied to the third sample but before the sixth force has been applied to the third sample.

11. The method of claim 3 and wherein the step of flexing the first sample includes flexing the first housing.

12. The method of claim 11 and wherein the step of flexing the first housing comprises twisting the first housing.

13. The method of claim 6 and wherein the step of subjecting the first sample to a deterioration process comprises baking the first sample in an oven.

14. A method comprising the steps of:

fixing a light source and an optical fiber to a housing; the light source, optical fiber and the housing being part of a first sample;

the optical fiber having a first and second end, the light source located closer to the first end than to the second end, applying a first mechanical force to the first sample; and examining the light output at the second end of the optical fiber after applying the first mechanical force;

applying a second mechanical force to the first sample wherein the second mechanical force differs from the first mechanical force;

examining the light output at the second end of the optical fiber after applying the second mechanical force; and producing an indication of acceptability if the light output after applying the first mechanical force, but before applying the second mechanical force, satisfies a first criteria and if the light output after applying the second mechanical force satisfies the first criteria.

15. The method of claim 14 further wherein the first criteria is a threshold.

16. The method of claim 14 further wherein the first mechanical force is applied in a first dimension;

the second mechanical force is applied in a second dimension; and wherein the first dimension and the second dimension differ.

17. The method of claim 15 further wherein the first mechanical force is applied in a first dimension;

the second mechanical force is applied in a second dimension; and wherein the first dimension and the second dimension differ.

* * * * *